United States Patent
Eyer

(10) Patent No.: US 10,542,321 B2
(45) Date of Patent: Jan. 21, 2020

(54) RECEIVER AND SYSTEM USING AN ELECTRONIC QUESTIONNAIRE FOR ADVANCED BROADCAST SERVICES

(71) Applicant: Saturn Licensing LLC, New York, NY (US)

(72) Inventor: Mark Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/391,610

(22) Filed: Dec. 27, 2016

(65) Prior Publication Data
US 2017/0245014 A1   Aug. 24, 2017

Related U.S. Application Data

(63) Continuation of application No. 13/046,579, filed on Mar. 11, 2011, now abandoned.
(Continued)

(51) Int. Cl.
*G06Q 30/02* (2012.01)
*H04N 21/45* (2011.01)
(Continued)

(52) U.S. Cl.
CPC ....... *H04N 21/4758* (2013.01); *H04N 21/433* (2013.01); *H04N 21/435* (2013.01);
(Continued)

(58) Field of Classification Search
CPC ......... H04N 21/44222; H04N 21/4532; H04N 21/4667; H04N 21/4756; H04N 21/4622;
(Continued)

(56) References Cited

U.S. PATENT DOCUMENTS

| 5,915,243 A | * | 6/1999 | Smolen | G06Q 30/02 379/92.01 |
| 6,115,737 A | | 9/2000 | Ely et al. | |

(Continued)

FOREIGN PATENT DOCUMENTS

| CN | 1332937 A | 1/2002 |
| CN | 1343334 A | 4/2002 |

(Continued)

OTHER PUBLICATIONS

Chinese Office Action dated Mar. 10, 2015, for Chinese Patent Application No. 201180015323.2 (English translation provided).
(Continued)

*Primary Examiner* — Pankaj Kumar
*Assistant Examiner* — Alazar Tilahun
(74) *Attorney, Agent, or Firm* — Oblon, McClelland, Maier & Neustadt, L.L.P.

(57) ABSTRACT

According to one embodiment of the invention, a computer-implemented method for a digital broadcast system is described. The method involves an operation of receiving an electronic questionnaire that includes a plurality of questions registered to avoid duplication of any one of the plurality of questions. The electronic questionnaire, when processed by a receiver of the digital broadcast system, generates for display a plurality of questions. The receiver acquires answers to the electronic questionnaire, where the answers are used in adjusting content subsequently downloaded to the receiver.

15 Claims, 11 Drawing Sheets

Related U.S. Application Data

(60) Provisional application No. 61/319,873, filed on Apr. 1, 2010, provisional application No. 61/354,498, filed on Jun. 14, 2010.

(51) Int. Cl.
| | |
|---|---|
| *H04N 21/47* | (2011.01) |
| *H04N 21/475* | (2011.01) |
| *H04N 21/433* | (2011.01) |
| *H04N 21/435* | (2011.01) |
| *H04N 21/454* | (2011.01) |
| *H04N 21/258* | (2011.01) |
| *H04N 21/466* | (2011.01) |

(52) U.S. Cl.
CPC ........... *H04N 21/454* (2013.01); *G06Q 30/02* (2013.01); *G06Q 30/0208* (2013.01); *G06Q 30/0212* (2013.01); *G06Q 30/0242* (2013.01); *G06Q 30/0269* (2013.01); *H04N 21/25891* (2013.01); *H04N 21/4667* (2013.01)

(58) Field of Classification Search
CPC ........... H04N 21/44008; H04N 21/458; H04N 21/482; H04N 21/812; H04N 21/2668; H04N 21/2665; H04N 21/431; H04N 21/252; H04N 21/4182; H04N 21/4316; H04N 21/4758; H04N 21/454; H04N 21/435; H04N 21/433; H04N 21/25891; G06Q 30/02; G06Q 30/0269; G06Q 10/107; G06Q 30/0212; G06Q 30/0242; G06Q 30/0255; H04H 60/33; H04H 60/74; H04H 60/66
USPC .......................................... 725/23, 24, 34–36
See application file for complete search history.

(56) References Cited

U.S. PATENT DOCUMENTS

| | | | |
|---|---|---|---|
| 6,160,570 A | 12/2000 | Sitnik | |
| 6,850,252 B1 | 2/2005 | Hoffberg | |
| 7,030,890 B1 | 4/2006 | Jouet et al. | |
| 7,051,064 B1 | 5/2006 | Yamagishi et al. | |
| 7,093,000 B1 | 8/2006 | Yamagishi et al. | |
| 7,328,402 B1 | 2/2008 | Yamagishi et al. | |
| 7,363,307 B1 | 4/2008 | Yamagishi et al. | |
| 7,706,740 B2 | 4/2010 | Collins et al. | |
| 8,099,752 B2 | 1/2012 | Eyer | |
| 8,285,196 B2 | 10/2012 | Rao | |
| 2002/0019769 A1 | 2/2002 | Barritz et al. | |
| 2002/0032905 A1 | 3/2002 | Sherr et al. | |
| 2002/0069403 A1 | 6/2002 | Itoh et al. | |
| 2002/0077880 A1 | 6/2002 | Gordon et al. | |
| 2002/0095431 A1 | 7/2002 | Mc George et al. | |
| 2002/0152458 A1 | 10/2002 | Eyer et al. | |
| 2003/0144899 A1 | 7/2003 | Kokubo | |
| 2003/0172381 A1 | 9/2003 | Janevski | |
| 2004/0064836 A1 | 4/2004 | Ludvig et al. | |
| 2004/0255322 A1 | 12/2004 | Meadows et al. | |
| 2004/0261127 A1 | 12/2004 | Freeman et al. | |
| 2005/0102696 A1* | 5/2005 | Westberg ........... | H04N 5/44543 725/46 |
| 2005/0172331 A1 | 8/2005 | Blackketter et al. | |
| 2006/0015904 A1 | 1/2006 | Marcus | |
| 2006/0107195 A1 | 5/2006 | Ramaswamy et al. | |
| 2006/0206912 A1 | 9/2006 | Klarfeld et al. | |
| 2006/0259923 A1 | 11/2006 | Chiu | |
| 2007/0136752 A1 | 6/2007 | Sanders | |
| 2007/0143238 A1 | 6/2007 | Kochunni et al. | |
| 2008/0090513 A1* | 4/2008 | Collins ................. | H04H 60/65 455/3.01 |
| 2008/0119132 A1 | 5/2008 | Rao | |
| 2008/0119133 A1 | 5/2008 | Rao | |
| 2008/0119134 A1 | 5/2008 | Rao | |
| 2008/0160490 A1 | 7/2008 | Gomes et al. | |
| 2009/0119234 A1 | 5/2009 | Pinckney et al. | |
| 2009/0144797 A1 | 6/2009 | Wang et al. | |
| 2009/0152349 A1 | 6/2009 | Bonev | |
| 2009/0271815 A1 | 10/2009 | Contin et al. | |
| 2009/0281392 A1 | 11/2009 | Brown | |
| 2009/0300143 A1 | 12/2009 | Musa et al. | |
| 2009/0320059 A1* | 12/2009 | Bolyukh ............... | H04H 20/106 725/32 |
| 2010/0134701 A1 | 6/2010 | Eyer | |
| 2010/0251305 A1 | 9/2010 | Kimble et al. | |
| 2011/0075990 A1 | 3/2011 | Eyer | |
| 2011/0088075 A1 | 4/2011 | Eyer | |
| 2011/0161999 A1 | 6/2011 | Klappert et al. | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0185888 A1 | 7/2012 | Eyer et al. | |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0055313 A1 | 2/2013 | Eyer | |

FOREIGN PATENT DOCUMENTS

| | | |
|---|---|---|
| CN | 1143539 C | 3/2004 |
| CN | 1504943 A | 6/2004 |
| CN | 1197369 C | 4/2005 |
| CN | 101047807 A | 10/2007 |
| CN | 101047826 A | 10/2007 |
| CN | 101106696 A | 1/2008 |
| CN | 101681469 A | 3/2010 |
| JP | 2003-216798 A | 7/2003 |
| KR | 10-2007-0042151 | 4/2007 |
| KR | 10-0824600 | 4/2008 |
| KR | 10-2009-0044506 | 5/2009 |
| KR | 10-2010-0001219 | 1/2010 |
| WO | WO 02/17633 A2 | 2/2002 |

OTHER PUBLICATIONS

Chinese Office Action dated Jun. 26, 2015, for Chinese Patent Application No. 201180015323.2 (English translation provided).
Extended European Search Report dated Dec. 5, 2014, for European Patent Appln No. 11763189.5.
Extended European Search Report dated Dec. 5, 2014, for European Patent Appln No. 11763226.5.

(56) References Cited

OTHER PUBLICATIONS

Korean Office Action dated Apr. 26, 2013, for Korean Patent Application No. 10-2013-7001963 (English translation provided).
Korean Office Action dated May 23, 2013, for Korean Patent Application No. 10-2011-7003737 (English translation provided).
Korean Office Action dated Nov. 23, 2012, for Korean Patent Application No. 10-2011-7003737 (English translation provided).
Korean Office Action dated Dec. 23, 2012, for Korean Patent Application No. 10-2013-7011623 (English translation provided).
Korean Office Action dated Jul. 16, 2014, for Korean Patent Application No. 10-2013-7028918 (English translation provided).
Korean Office Action dated Aug. 28, 2014, for Korean Patent Application No. 10-2013-7031477 (English translation provided).
Korean Office Action dated Jun. 11, 2012, for Korean Patent Application No. 10-2011-7007470 (English translation provided).
Korean Office Action dated Aug. 6, 2013, for Korean Patent Application No. 10-2011-7003737 (English translation provided).
Korean Office Action dated Dec. 26, 2012, for Korean Patent Application No. 10-2011-7007470 (English translation provided).
Korean Office Action dated Apr. 3, 2013, for Korean Patent Application No. 10-2011-7007470(English translation provided).
Korean Office Action dated Mar. 14, 2014, for Korean Patent Application No. 10-2013-7015827 (English translation provided).
PCT International Search Report for PCT/US11/23629 dated Apr. 4, 2011.
Office Action dated Jul. 24, 2013, in Korean Application No. 10-2013-7011623 with English translation.
Office Action dated Sep. 4, 2013, in Korean Application No. 10-2013-7015827 with English translation.
Korean Office Action dated Jan. 23, 2014 in Patent Application No. 10-2013-7028918 with English Translation.
Korean Office Action dated Feb. 7, 2014 in Patent Application No. 10-2013-7031477 with English Translation.
Chinese Office Action dated Dec. 12, 2014, in China Patent Application No. 201180015025.3 (with English translation).
Chinese Office Action dated Jul. 30, 2014, in China Patent Application No. 201180015323.2 (with English translation).
Korean Office Action dated Jul. 14, 2014, in Korea Patent Application No. 10-2014-7008936 (with English translation).
Chinese Office Action dated Jun. 30, 2014, in China Patent Application No. 201180015025.3 (with English translation).
Office Action dated Sep. 28, 2017 in European Patent Application No. 11 763 226.5.
Anonymous: "Application programming interface—Wikipedia", Mar. 31, 2010, XP055408848, 6pages URL:https://en.wikipedia.org/w/index.php? title=Application_programming_interface&oldid=353118540.
Combined Chinese Office Action and Search Report dated Sep. 20, 2017 in corresponding Patent Application No. 201510332520.7 (with English Translation), 21 page.
Chinese Office Action dated Jan. 6, 2016, issued in Chinese Patent Application No. 201180015323.2.
Chinese Office Action dated Apr. 1, 2015, issued in Chinese Patent Application No. 201180015025.3.
Korean Office Action dated Apr. 27, 2012, issued in Korean Patent Application No. 10-2011-7003737.
Korean Office Action dated Sep. 25, 2014, issued in Korean Patent Application No. 10-2011-7003737.
Korean Office Action dated Oct. 29, 2013, issued in Korean Patent Application No. 10-2013-7001963 (with English translation).
Korean Office Action dated Jan. 6, 2014, issued in Korean Patent Application No. 10-2013-7001963.
International Search Report dated May 17, 2011, issued in PCT Application No. PCT/US2011/029235.
Korean Office Action dated Mar. 10, 2014, issued in Korean Patent Application No. 10-2013-7011623.
Korean Office Action dated May 15, 2014, issued in Korean Patent Application No. 10-2013-7015827.
Korean Office Action dated Sep. 17, 2014, issued in Korean Patent Application No. 10-2013-7028918.
Korean Office Action dated Nov. 3, 2014, issued in Korean Patent Application No. 10-2013-7031477.
Korean Office Action dated Jan. 6, 2015, issued in Korean Patent Application No. 10-2014-7008936.
Korean Office Action dated Mar. 3, 2015 issued in Korean Patent Application No. 10-2013-7011621.
Mexican Office Action dated Apr. 3, 2014, issued in Mexican Patent Application No. MX/a/2012/011281.
Mexican Office Action dated Dec. 17, 2014, issued in Mexican Patent Application No. MX/a/2012/011281.
Mexican Office Action dated Aug. 3, 2015, issued in Mexican Patent Application No. MX/a/2012/011281.
Mexican Office Action dated Jun. 7, 2013, issued in Mexican Patent Application No. MX/a/2012/010599.
Mexican Office Action dated Nov. 25, 2013, issued in Mexican Patent Application No. MX/a/2012/010599.
Korean Office Action dated Jul. 24, 2013, issued in Korean Patent Application No. 10-2013-7011623.
Korean Office Action dated Sep. 4, 2013, issued in Korean Patent Application No. 10-2013-7015827.
Office Action dated Sep. 16, 2013 in Korean Patent Application No. 10-2013-7011623 (Dispatch No. 9-5-2013-0510123-79).
Office Action dated Jan. 20, 2014 in Korean Patent Application No. 10-2013-7011623 (Dispatch No. 9-5-2013-0887487-13).
Office Action dated Apr. 10, 2014 in Korean Patent Application No. 10-2013-7015827 (Dispatch No. 9-5-2014-0182694-01).
Office Action dated Oct. 30, 2013 in Korean Patent Application No. 10- 2013-7015827(Dispatch No. 9-5-2013-0623735-17).
Office Action dated Aug. 14, 2014 in Korean Patent Application No. 10-2013-7028918 (Dispatch No. 9-5-2014-0483173-52).
Office Action dated Mar. 21, 2014 in Korean Patent Application No. 10-2013-7028918 (Dispatch No. 9-5-2014-0053085-13).
Office Action dated Sep. 25, 2014 in Korean Patent Application No. 10-2013-7031477 (Dispatch No. 9-5-2014-0593010-21).
Office Action dated Apr. 3, 2014 in Korean Patent Application No. 10-2013-7031477 (Dispatch No. 9-5-2014-0091875-56).
Office Action dated Jun. 25, 2013 in Korean Patent Application No. 10-2013-7001963 (Dispatch No. 9-5-2013-0284641-16).
Office Action dated Nov. 27, 2013 in Korean Patent Application No. 10-2013-7001963 (Dispatch No. 9-5-2013-0743007-89).
Office Action dated Aug. 10, 2012 in Korean Patent Application No. 10-2011-7007470 (Dispatch No. 9-5-2012-0336072-66).
Office Action dated Jan. 24, 2013 in Korean Patent Application No. 10-2011-7007470 (Dispatch No. 9-5-2012-0788494-43).
Office Action dated Jun. 19, 2013 in Korean Patent Application No. 10-2011-7003737 (Dispatch No. 9-5-2013-0354115-98).
Office Action dated Jan. 22, 2013 in Korean Patent Application No. 10-2011-7003737 (Dispatch No. 9-5-2012-0710438-46).
Office Action dated Apr. 3, 2019 in Chinese Patent Application No. 201510332520.7, with partial English translation.
Combined Chinese Office Action and Search Report dated Sep. 20, 2017 in corresponding Patent Application No. 201510332520.7 (with English Translation), 21 pages.

\* cited by examiner

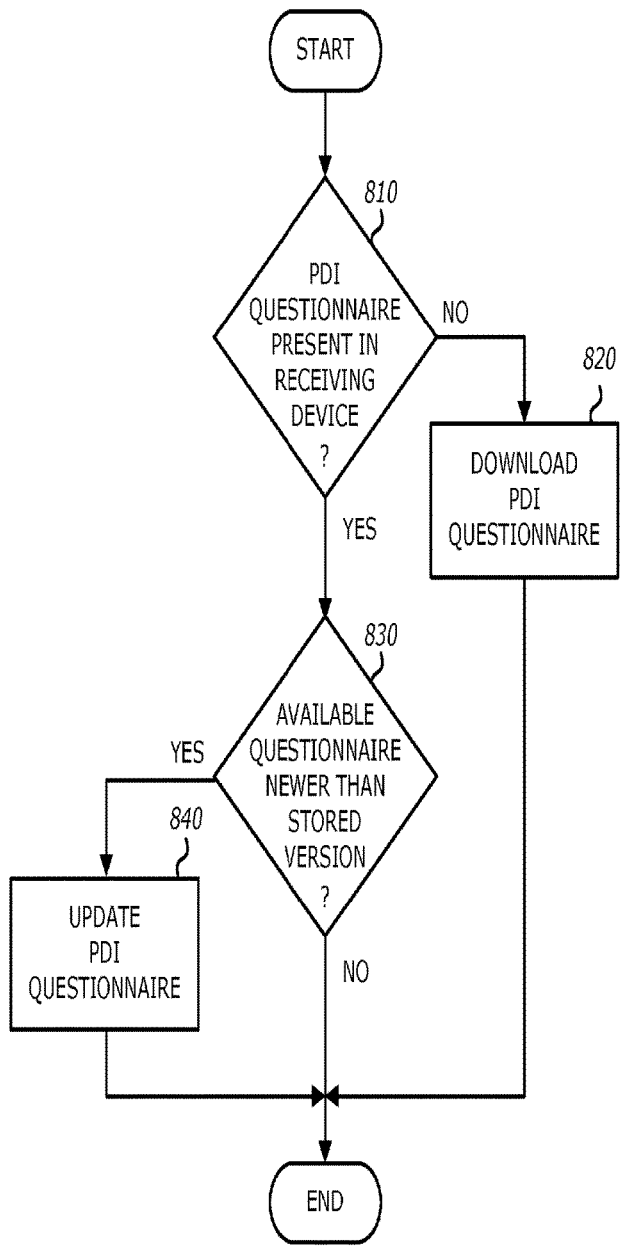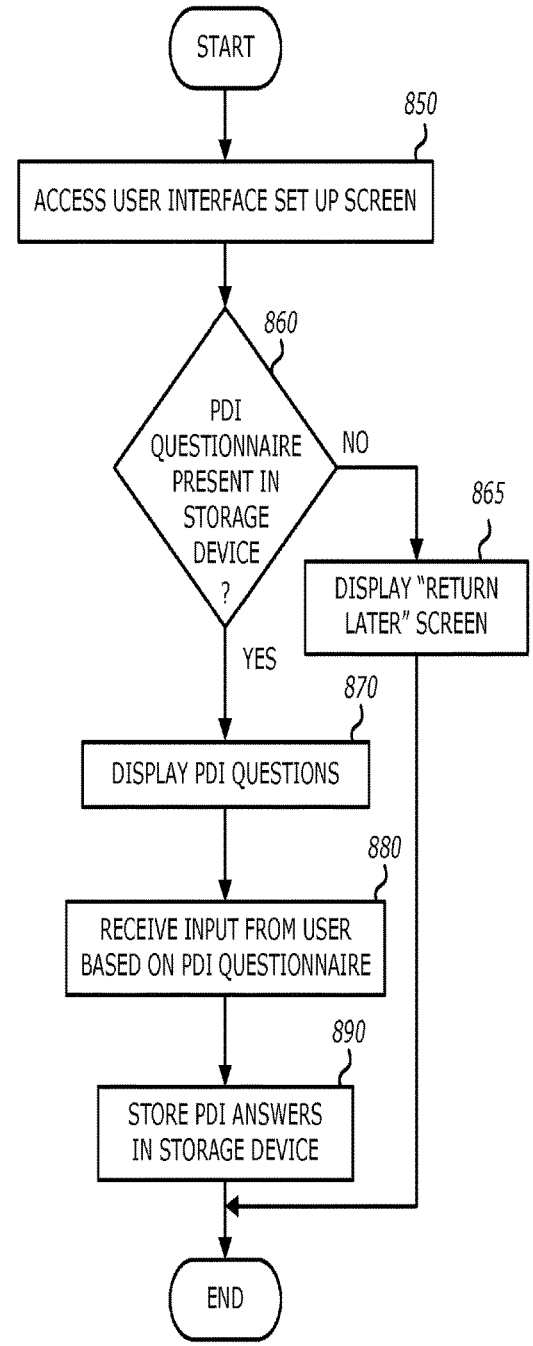
FIG. 8A
FIG. 8B

```
         <PDItable
900 ~→  <QBA>  ←----------------------------- QUESTION EXPECTING BOOLEAN TYPE ANSWER, YES OR NO
   910 ~→ <id>111</id>
   920 ~→ <q>Are you currently employed?</q>       950
         </QBA>                                    ↙
940 ~→<QIA minInclusive="10" maxInclusive="100", lifetime>  ←--- QUESTION EXPECTING VARIABLE INTEGER TYPE ANSWER
   910 ~→ <id>222</id>
   920 ~→ <q>What is the age of the oldest member of the household who watches television?</q>
         </QIA>
900 ~→<QSA minChoice="1" maxChoice="3">  ←------ QUESTION EXPECTING MULTIPLE SELECTION TYPE ANSWER
   910 ~→ <id>123</id>
   920 ~→ <q>In which of the following sports are you interested in viewing? (Multiple selection allowed)</q>
              ⎧ <a>Baseball</a>  ⎫
              ⎪ <a>Basketball</a>⎪
   930 ~→    ⎨ <a>Soccer</a>    ⎬ ←------ CANDIDATES FOR ANSWER
              ⎩ <a>Hockey</a>   ⎭
         </QSA>
900 ~→<QSA minChoice="1">  ←------------------ QUESTION EXPECTING SINGLE SELECTION TYPE ANSWER
   910 ~→ <id>ProgramX:123</id>
   920 ~→ <q>Do you enjoy camping and outdoor recreation? (Only one selection)</q>
              ⎧ <a>Never</a>       ⎫
   930 ~→    ⎨ <a>Occasionally</a> ⎬ ←------ CANDIDATES FOR ANSWER
              ⎩ <a>Frequently</a>  ⎭
         </QSA>
900 ~→<QTA>  ←------------------------ QUESTION EXPECTING VARIABLE TEXT TYPE ANSWER
   910 ~→ <id>321</id>
   920 ~→ <q>Do you have any idea to make interactive TV services much more attractive?</q>
         </QTA>
         </PDItable>
```

*FIG. 9*

RECEIVER AND SYSTEM USING AN ELECTRONIC QUESTIONNAIRE FOR ADVANCED BROADCAST SERVICES

CROSS-REFERENCE TO RELATED APPLICATIONS

This application is a continuation of U.S. application Ser. No. 13/046,579 filed on Mar. 11, 2011, which is based upon and claims the benefit of priority from U.S. Provisional Patent Application No. 61/319,873 filed Apr. 1, 2010 and U.S. Provisional Patent Application No. 61/354,498 filed Jun. 14, 2010, the entire contents of each of which are incorporated herein by reference.

FIELD

Embodiments of the present invention relate to the field of communications, and in particular an advanced digital television receiver and a corresponding method of distributing and responding to a preference, demographic and/or interest (PDI) questionnaire.

BACKGROUND

Traditional media distribution systems such as broadcasting lack the ability to effectively characterize and respond to consumer preferences in order to provide customized media content, namely content that includes targeted advertising or marketing material directed to interests of a particular user. In other words, conventional broadcasting does not account for situations where different viewers have different interests, and thus, their preferences with respect to programming and information differ vastly. For example, some viewers may want to watch sports broadcasting while other viewers may prefer a different genre (e.g. home improvement, historical fact based programs, etc.).

Furthermore, due to geographic location, some viewers may not be interested in certain media content. For example, a particular advertisement for local services may be suitable for viewers living in the geographic area served by the advertiser, but may not be suitable for viewers living in a different area.

Currently, there are no standardized methods to specify how viewers might customize their viewing preferences with respect to the content and services they receive. Existing systems may typically filter out program content based on viewer preference settings established in the receiver by the manufacturer of that receiver, with no input from the service provider as to the types of filtering criteria that might be suitable for the particular service.

Also, service providers do not have access to the viewer preference settings, and thus are unable to directly tailor the user's experience of the service based on those settings. Yet, even if service providers had access to viewer preferences, there is no mechanism that is configured to avoid redundant inquiries to learn about the viewer's preferences, as different service providers may solicit the same information through different, but highly similar inquiries.

BRIEF DESCRIPTION OF THE DRAWINGS

Embodiments of the present invention are illustrated by way of example, and not by way of limitation, in the figures of the accompanying drawings and in which:

FIG. 8A is an exemplary diagram illustrating one embodiment of a system and method for receiving a PDI questionnaire.

FIG. 8B is an exemplary diagram illustrating one embodiment of a system and method for interacting with the viewer to receive answers to the PDI questionnaire at a receiver.

FIG. 9 is an illustration of an example of a data structure in XML format for representation of PDI questions. As illustrated, standardization of preferences, demographics, and interests (PDIs) involve definition of a standard format for a representation of a downloadable questionnaire.

DETAILED DESCRIPTION

Figure 1:
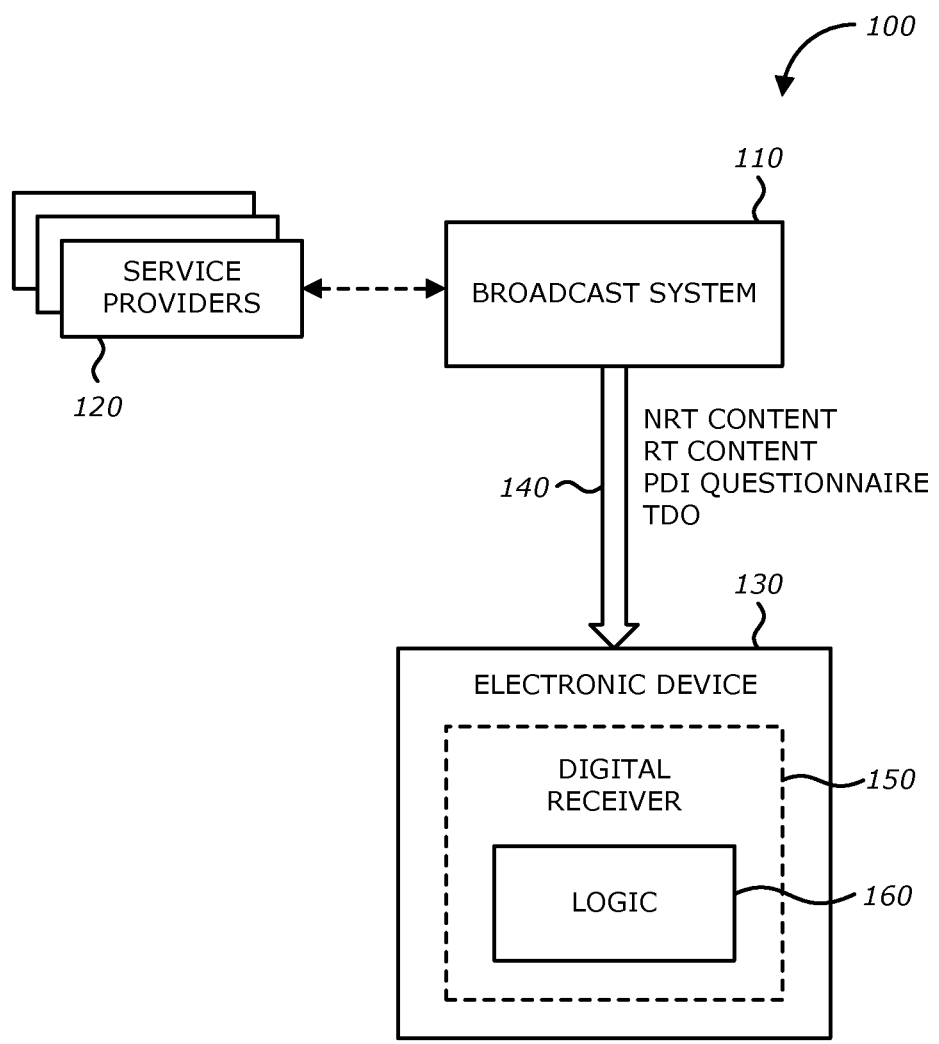
FIG. 1 is a block diagram illustrating one embodiment of a digital broadcasting system.

One embodiment of the invention relates to a digital receiver described herein. According to this embodiment of the invention, the digital receiver comprises a storage device and logic. The storage device is configured to store both (i) questions received from at least one service provider of a digital broadcast system and (ii) answers to the questions by one or more users. The logic is configured to process data received from the at least one service provider based on answers provided by the user(s).

Herein, according to one embodiment of the invention, the questionnaire and answers are stored locally. As an example, a first eXtensible Markup Language (XML) schema may be configured to represent a first set of questions and associated answer formats registered and accessible to all service providers. Similarly, a second XML schema may be configured for answers to the first set of questions for at least one user of the digital receiver. It is contemplated that the questions set forth in the first XML schema may be subject to public redistribution to avoid duplicative questions from being posed to the user during set-up, immediately after power-on, or at another point in time while the receiver is in operation.

Alternatively, it is contemplated that the first XML schema may represent (i) the first set of registered questions that are accessible to all service providers, (ii) a second set of registered questions that are service provider specific and have access restrictions (e.g., only accessible by the specific service provider), and (iii) answers formats for both sets of questions.

Herein, certain terminology is used to describe features of the invention. For example, the term "logic" is generally defined as hardware and/or software. As hardware, logic may include processing circuitry (e.g., a microprocessor, a programmable gate array, a controller, an application specific integrated circuit, etc.), semiconductor memory, combinatorial logic, or the like. As software, the logic may be one or more software modules, such as executable code in the form of an application, an application programming interface (API), an applet, a routine, or one or more instructions. These software modules may be stored in any type of a suitable non-transitory storage medium such as a programmable circuit, a semiconductor memory such as a volatile memory (e.g., random access memory (RAM), etc.) or non-volatile memory (e.g., read-only memory, power-backed RAM, flash memory, etc.), a hard disk drive, an optical disk drive, a portable memory device (e.g., a Universal Serial Bus "USB" flash drive, optical disc, etc.), or the like.

An "electronic device" generally represents electronics with information processing capabilities such as a digital receiver for example. As optional features, electronic device may include a display (e.g., liquid crystal diode ("LCD"), organic LCD (OLCD), plasma, etc.) and speakers to support video/audio playback.

An "interconnect" is generally defined as a communication pathway established over an information-carrying medium. This information-carrying medium may be a physical medium (e.g., electrical wire, optical fiber, cable, bus traces, etc.), a wireless medium (e.g., air in combination with wireless signaling technology) or a combination thereof.

A "service provider" generally represents a source and/or distributor of content. Examples of a service provider may include, but are not limited or restricted to a television network operator (e.g. local network television station, affiliate, cable television provider, telco, terrestrial, satellite TV provider, Internet service provider, etc.), an entity supplying access to stored content (e.g., Netflix®, etc.), or the like.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

FIG. 1 is an exemplary block diagram illustrating one embodiment of a digital television service system 100. A broadcast system 110 receives content from one or more service providers 120, and thereafter, transmits such content to an electronic device 130 over interconnect 140.

According to one embodiment of the invention, the transmitted content includes one or more of the following: non-real-time (NRT) content, real-time or linear content, metadata associated with content, a questionnaire, and a triggered declarative object (TDO).

Herein, the NRT content comprises content that may be delivered faster or slower than real-time or may be delivered based on a request. For instance, according to one embodiment of the invention, the NRT content may include video and/or audio, images, text (e.g., descriptions of available video and/or audio for download), and/or hyperlinks to websites that can be displayed by a web browser executed by electronic device 130.

According to one embodiment of the invention, a user can select NRT content from a list of NRT content stored at service provider 120 for later download. The user can also navigate and select NRT content from among previously downloaded content or the downloading of content may be performed in accordance with advanced services.

According to one embodiment of the invention, "advanced services" may include user-controlled downloading of non-real time content, user interactivity with the downloaded content, or any user-controlled feature supported by Advanced Television Systems Committee (ATSC) or other specifications developed for digital television transmission over terrestrial, cable and satellite networks. Of course, the invention may be applicable to advanced services in compliance with other data conveyance standards, including Internet Protocol Television (IPTV).

Herein, advanced services associated with NRT content may be request-based or automated where electronic device 130, at least including a digital receiver, updates content associated with a service. For automated services, the receiver caches service-related content and automatically updates files as new versions are made available. For request-based "push" service, content that has been preloaded is displayed.

Metadata associated with content describes the available content and services.

The electronic questionnaire is adapted to allow users to specify various items of information about themselves, which allows electronic device 130 to tailor advanced services based on the users' individual interests and preferences. According to one embodiment of the invention, the questionnaire includes a data structure having a standardized format of preferences, demographics, and/or interests (PDIs) common to one or more service providers. For example, the format of the PDI questionnaire includes questions, each with an answer in a predefined format. Possible answer formats could include yes/no or true/false, text string (with maximum length), multiple choice, integer (with range limits), checklist, among others. FIG. 9 illustrates an example of a format and data structure of an example PDI questionnaire.

A TDO is a downloadable object created by one of service providers 120 in a content distribution chain, ranging from an original creator or source of the content to the manufacturer of the electronic device adapted to receive the content. According to one embodiment of the invention, a TDO comprises declarative content (e.g., scripts, text, descriptive markup, graphics, etc.) whose function and behavior are tied in some way to the television programming they accompany. For example, a TDO may be adapted with multiple functions such as to collect user response data such as voting on a game show or contest, feedback on televised programming or commercials, feedback on anticipated future events by the user (e.g. activities, upcoming purchases, etc.), or the like.

Referring still to FIG. 1, according to one embodiment of the invention, electronic device 130 may be implemented as a set-top box or a display device (e.g., television) that comprises a digital receiver 150. Digital receiver 150 includes logic 160 configured to process content received from broadcast system 110 as further described below. In one embodiment, logic 160 includes a processor capable of handling services broadcast according to Advanced Television Systems Committee (ATSC) standards.

Figure 2:
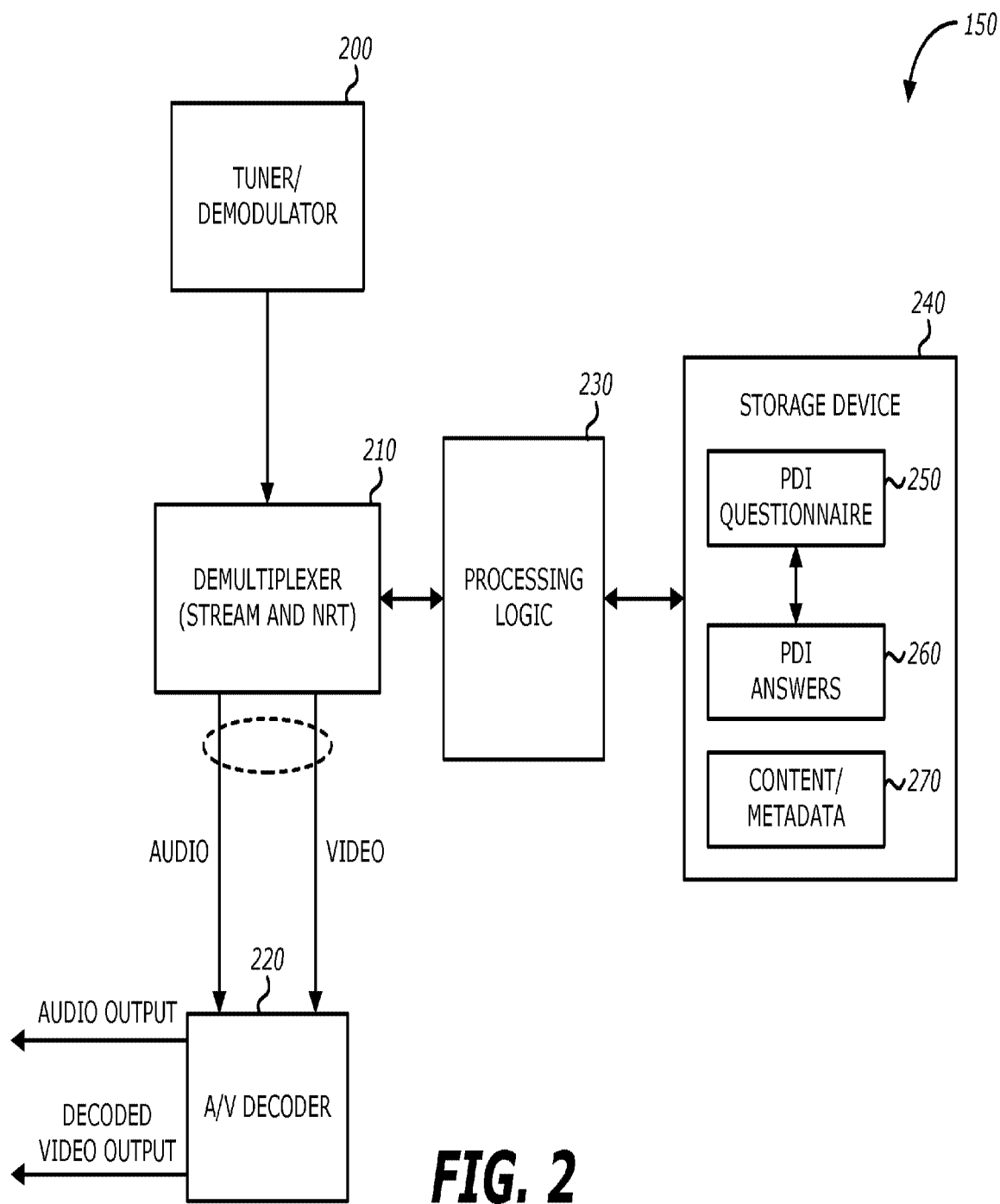
FIG. 2 is a block diagram illustrating one embodiment of a digital receiver implemented within an electronic device of the digital broadcasting system.

FIG. 2 is a block diagram illustrating one embodiment of digital receiver 150 implemented within electronic device 130. Digital receiver 150 is adapted to receive both real-time television broadcasts and NRT content. Receiver 150 includes a tuner/demodulator 200, a demultiplexer 210, an audio/video decoder 220, processing logic 230, and a storage device 240.

Tuner 200 receives a modulated input signal, tunes and demodulates the signal to produce an output transport stream. Demultiplexer 210 demultiplexes the stream to produce data to processing logic 230. In the case of conventional real-time (linear) TV content, audio and video packets from tuner/demodulator 200 are supplied, via demultiplexer 210, to A/V decoder 220 for decoding. A/V decoder 220 supplies an audio output signal and a video output signal to audio and video circuitry of the display device (not shown).

Content including audio/video, PDI questionnaires, NRT files, metadata, and TDOs received at demultiplexer 210 is routed via processing logic 230 to storage device 240. According to one embodiment of the invention, storage device 240 stores one or more PDI questionnaires 250, answers 260 to PDI questionnaire(s) 250, as well as content and metadata 270. Herein, a PDI questionnaire 250 is a downloadable list of questions that is generated by at least one service provider and has a standardized data structure. These questions can be presented to the user as selective, displayable images or as audio.

Storage device 240 may include a disc drive, a non-volatile memory, or any other types of data storage device. When a user instructs the system to play a selected item of NRT content, that content is then processed by processing logic 230 and the processed content is demultiplexed by demultiplexer 210 to provide audio and video packets to A/V decoder 220. These audio and video packets are eventually presented to the user.

Figure 3A:
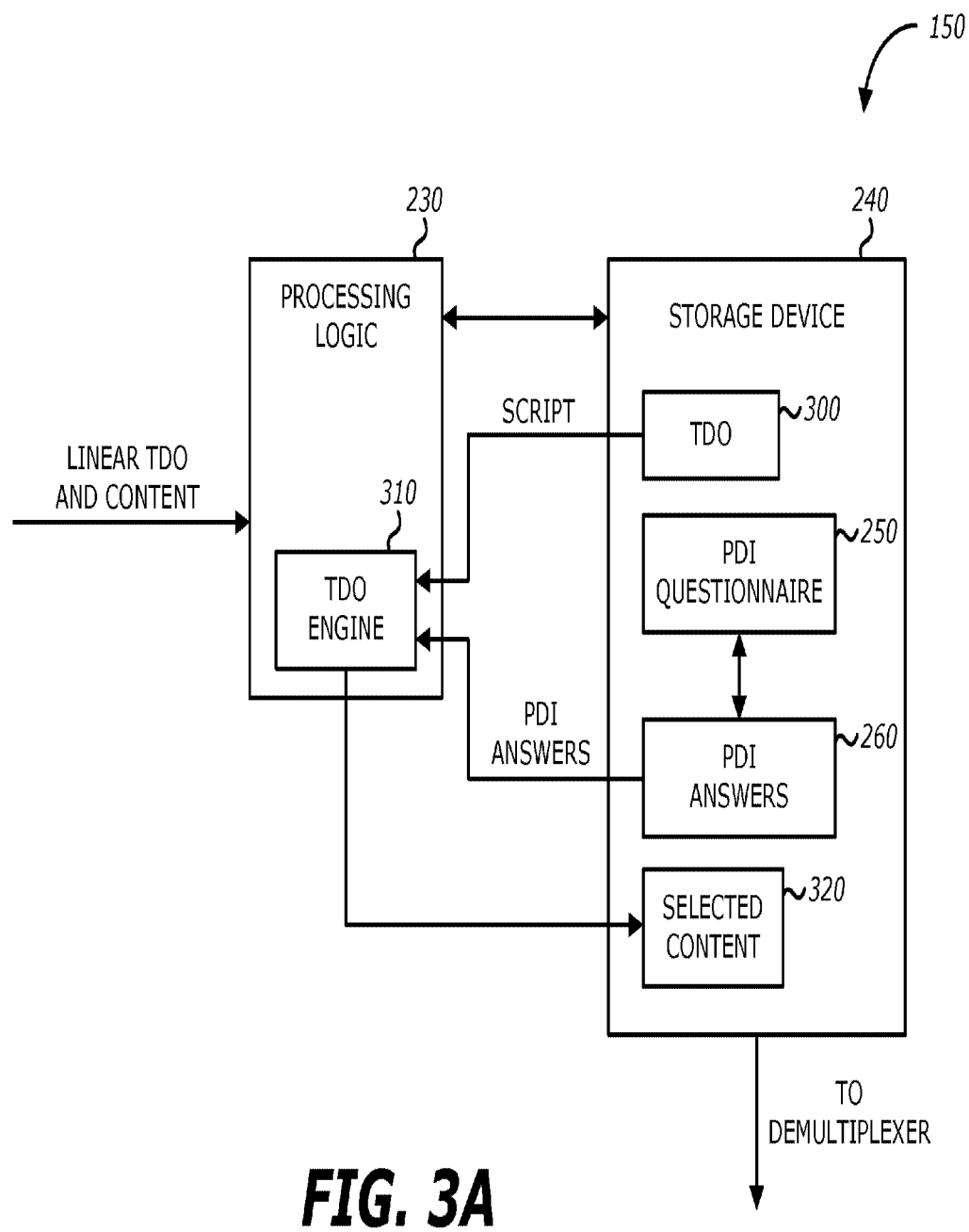
FIG. 3A is a block diagram illustrating one embodiment of a receiver receiving a triggered declarative object (TDO).

FIG. 3A is an exemplary block diagram illustrating one embodiment of receiver 150 receiving triggered declarative objects (TDOs). As previously discussed, TDOs are downloadable objects configured to interact with a user to enhance his/her viewing experience. A user may be notified that an enhanced (interactive) experience is being offered and accompanies a given program.

For instance, according to one illustrative example, a user viewing an advertisement is offered the option to visit a website pertinent to the product or service being advertised. If the questionnaire includes an entry for "what is your zip code," a Detailed Product Info TDO can condition the response to the user's interest in the product or service on that viewer's physical location. Thus, if the user lives on the west side of the city, the link could take him or her to a dealer located on the west side of the city, or if he or she lives somewhere else, to a different web page.

In another example, the playback of NRT content can be conditioned on answers to the PDI questionnaire. Again using the zip code as an item of personal information known to the system, when the user plays NRT content, specific items of content can be selected based on the viewer's physical location. Thus, an advertisement for a car dealer located in the viewer's neighborhood can be placed into the output stream for that viewer, while other viewers residing in different locations could get alternative advertisements as appropriate.

TDO 300 (e.g., scripts and associated data such as graphics, text, audio files, HTML, etc.) may be stored in storage device 240. Processing logic 230 executes an operation of TDO 300 with a TDO engine 310. For example, processing logic 230 executes a script of Detailed Product Info TDO to display the option to visit websites in which further information about a product or service may be found.

Storage device 240 also includes one or more PDI questionnaires 250 and PDI answers 260. PDI answers 260 contain answers to the questions in PDI questionnaire(s) 250 such as, for this example, the viewer's zip code. PDI questionnaire(s) 250 and answers 260 may be in a standardized data structure format common to various service providers.

According to one embodiment of the invention, when executed by TDO engine 310, TDO 300 accesses PDI answers 260 through an Application Programming Interface (API) and exhibits actions and behaviors conditionally based on responses recorded in PDI answers 260. A script in TDO 300 could, for example, create one user experience if the age of the oldest TV-watching member of the household is 35 or less and a different experience otherwise. Different user experiences can include display of different text or graphics, branching to different audio/video content, and including different choices in a list.

In another embodiment of the invention, selected content 320 from the TDO 300 in response to PDI answers 260 may be stored within storage device 240.

Figure 3B:
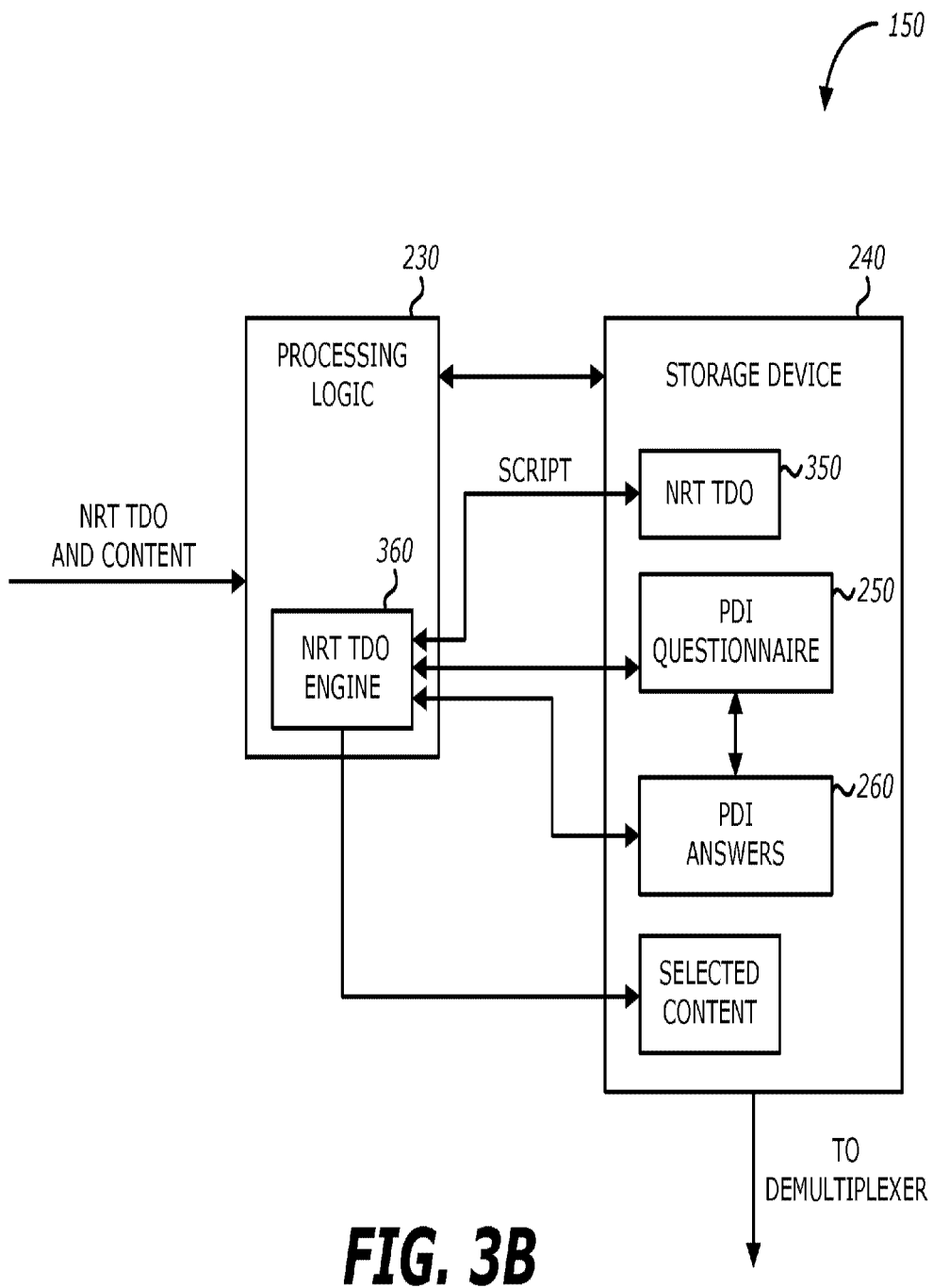
FIG. 3B is a block diagram illustrating one embodiment of a receiver receiving non-real time (NRT) triggered declarative objects (TDOs).

FIG. 3B is an exemplary block diagram illustrating one embodiment of receiver 150 receiving non-real time (NRT) triggered declarative objects (TDOs). Similarly, processing logic 230 executes a script from NRT TDO 350 with a NRT TDO engine 360. For example, NRT TDO 350 includes all the functionality of a regular TDO 300 of FIG. 3A, and in addition may include references to NRT content and scripted control objects that, if activated, cause receiver 150 to set up a future download of an NRT content item, and/or hyperlinks that allow playback of previously downloaded content.

In one embodiment, when executed in engine 360, the script in NRT TDO 350 accesses PDI questionnaire 250 and PDI answers 260 through an API and behaves based on PDI answers 260. For example, a script in a NRT TDO 350 could offer the user with a choice to select and purchase a baseball game program for a particular team based the user's interest in sports and baseball as captured in PDI answers 260 (assuming questions in these categories are included in the questionnaire).

Figure 4:
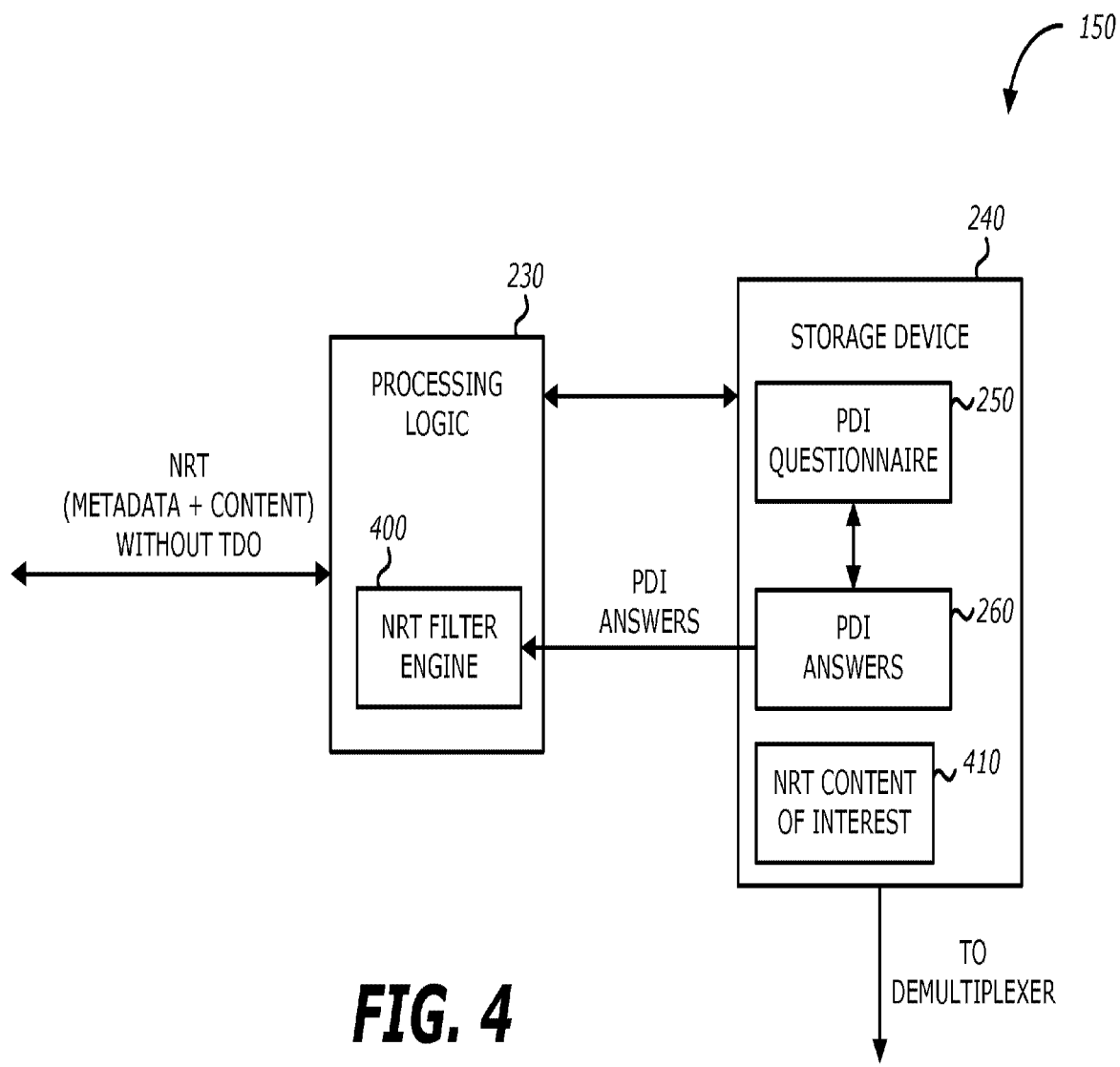
FIG. 4 is a block diagram illustrating another embodiment of a receiver that is adapted to receive non-real time (NRT) content

FIG. 4 is a block diagram illustrating another embodiment of receiver 150 that is adapted to receive non-real time (NRT) content. Processing logic 230 filters content according to PDI answers 260 to PDI questionnaire 250 using a content filter/matching engine 400 in lieu of TDOs. For example, processing logic 230 matches a local advertisement based on a geographic region of the user as specified in his/her PDI answers 260. Metadata received at processing logic 230 is tied to questions within PDI questionnaire 250 that are assigned an ID value. As such, filter engine 400 is able to know which PDI answer relates to the PDI question directed to the geographic location of the user.

In one embodiment, processing logic 230 filters and stores NRT content of interest 410 based on the interest of the user. For example, movie previews or trailers matching the preference (e.g., action, drama, comedy, etc. . . . ) of the user as set forth in PDI answers 260 are stored in storage device 240.

Figure 5:
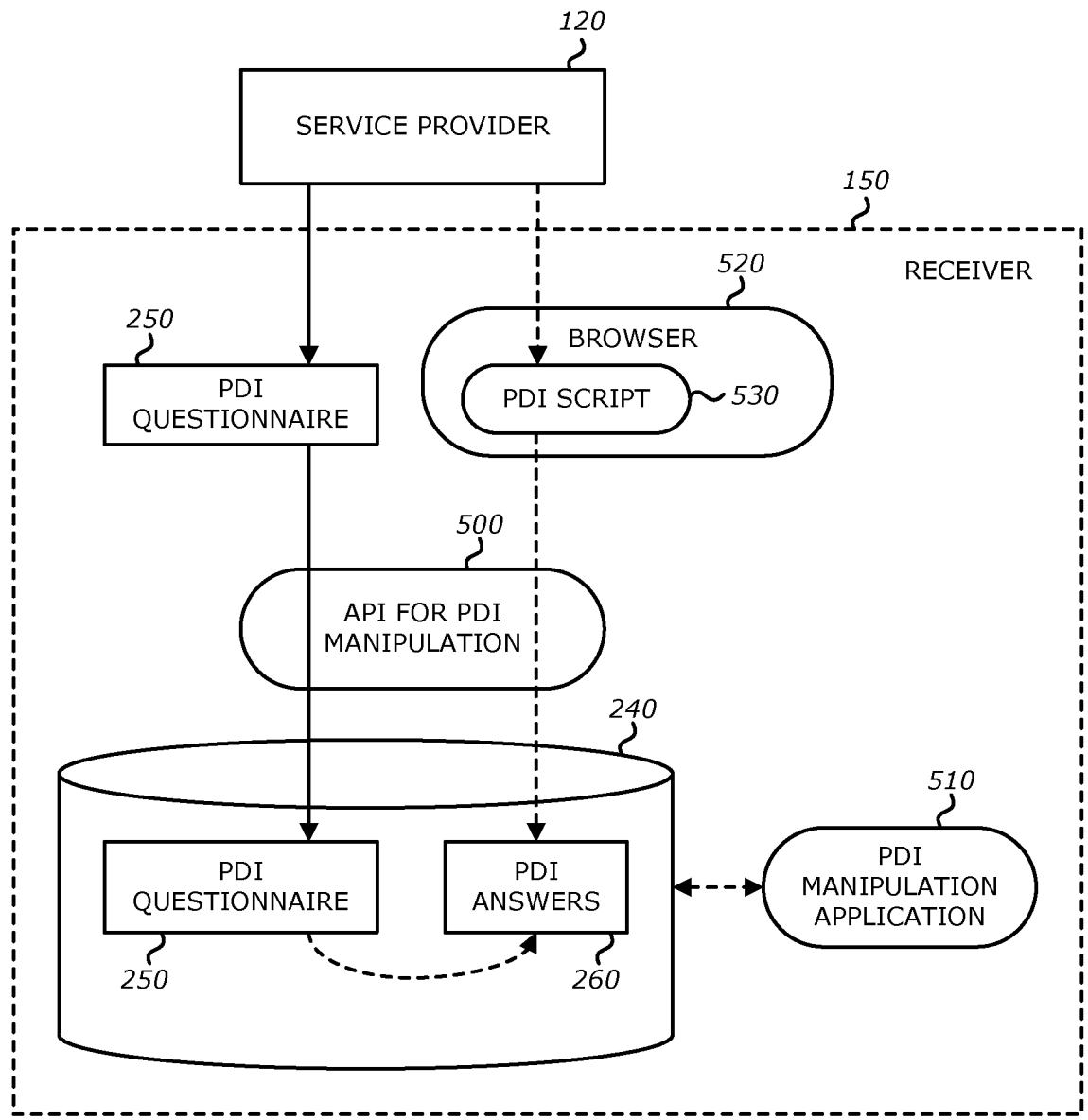
FIG. 5 is a block diagram illustrating one embodiment of a system for storing and manipulating a PDI questionnaire in a receiver.

FIG. 5 is a block diagram illustrating one embodiment of a system for storing and manipulating PDI questionnaires in a receiver. A service provider 120 generates a PDI questionnaire 250 that is transmitted to digital receiver 150. An API for PDI manipulation 500 allows for receiver 150 to store PDI questionnaire 250 in storage device 240. A user (e.g., viewer) is able to generate, update, and delete PDI answers 260 to questions within PDI questionnaire 250 via PDI manipulation application 510. In one example, PDI manipulation application 510 takes the form of a set-up screen on a display device coupled to receiver 150.

In another embodiment, a web browser 520 of receiver 150 includes a script 530 configured to write and generate PDI answers 260 to PDI questionnaire 250.

Figure 6:
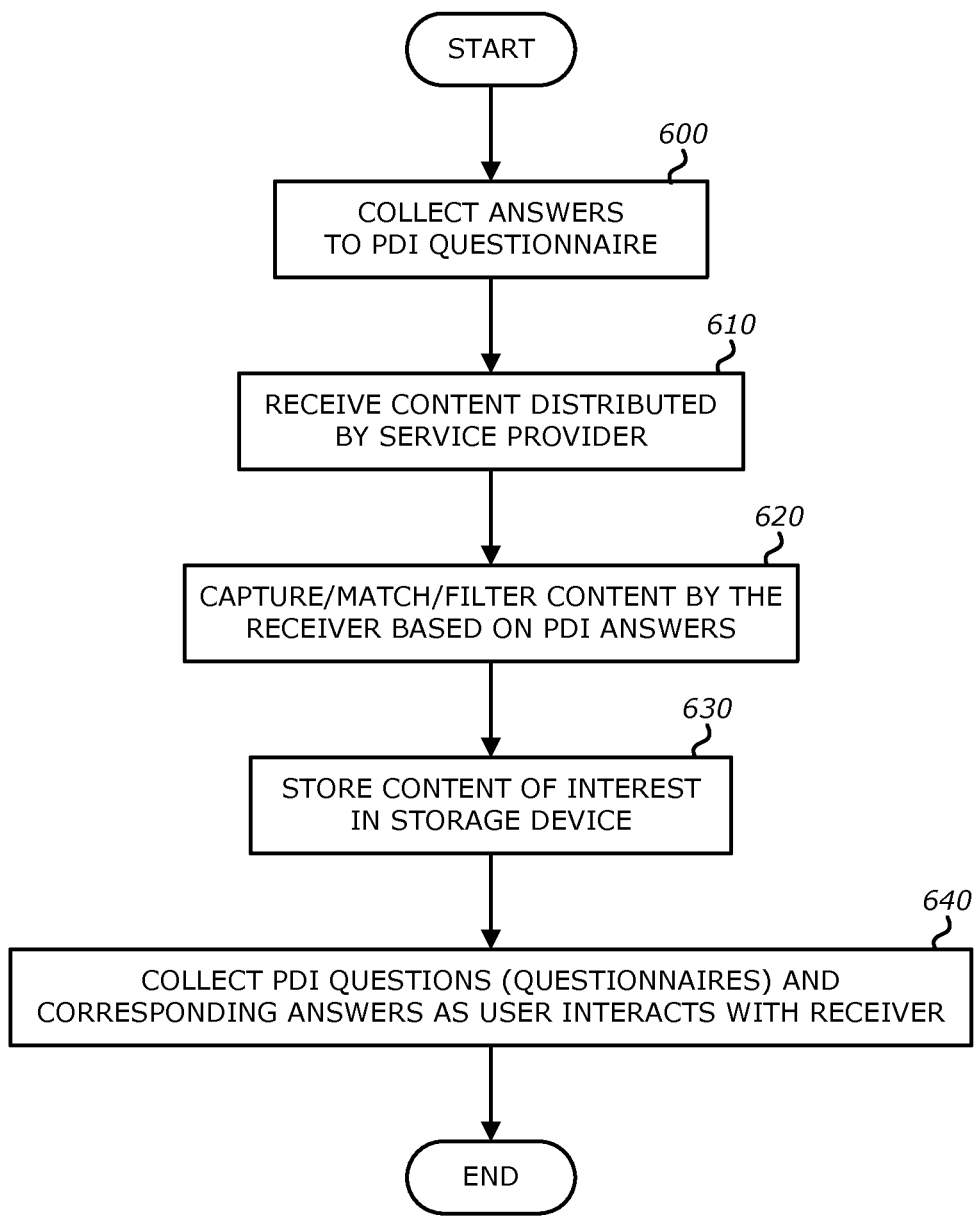
FIG. 6 is a block diagram illustrating one embodiment of a system for altering content based on answers to a PDI questionnaire in a receiver.

FIG. 6 is a block diagram illustrating one embodiment of a system for altering content based on answers to a PDI questionnaire in a receiver. At block 600, the PDI questionnaire is displayed via the user's interaction with one or more set-up screens to solicit answers pertaining to preferences, demographics and interests of one or more users of the electronic device.

Thereafter, when in operation, the digital receiver within the electronic device receives content from a service provider (block 610). The receiver captures, matches, or filters such content based on PDI answers (block 620). The content of interest (e.g. content that matches the preferences of the user as specified in the PDI answers) can be stored in the storage device 240 (block 630).

It is contemplated that these PDI questions and corresponding answers may be collected as the user interacts with the receiver via a set-up menu, and may be stored in the receiver for use by provider-supplied applications, including the TDOs (block 640). This collection (and subsequent registration) of PDI questions/answers provide a platform to avoid duplicate query questions from multiple service providers.

One technique for avoiding question duplication is to utilize a registration entity and registration process for questions (and the associated answer format). Once registered, a question is assigned a question identifier. As a result, service providers can use the same question identifier to solicit the desired information in lieu of issuing substantially similar questions. This avoids the need for the digital receiver to recognize and handle duplicate questions, and eliminates the possibility that a user would be asked multiple times essentially the same question in different ways (or in exactly the same way).

Figure 7A:
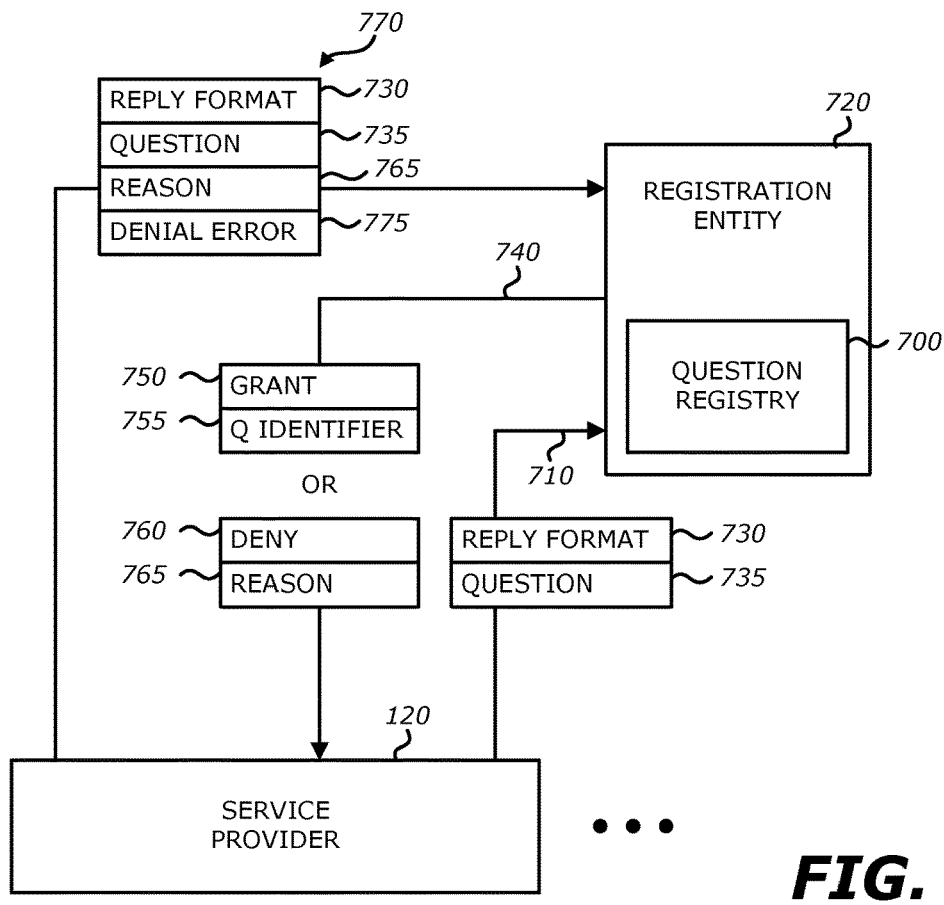
FIG. 7A is an exemplary diagram illustrating a first embodiment directed to the registration of questions within a PDI questionnaire.

FIG. 7A is an exemplary diagram illustrating a first embodiment directed to the registration of questions within a PDI questionnaire. Herein, according to one embodiment of the invention, in efforts to develop a question registry 700, service provider 120 transmits a question inquiry request 710 to a registration entity 720. The "registration entity" may be a governmental agency, a third-party entity (e.g., Advanced Television Systems Committee "ATSC" or other standards body, bank or trusted institution, etc.) or any entity assigned the responsibility of receiving questions that are to be used for a PDI questionnaire, checking for duplicates, and (assuming the request is accepted) assigning question identifiers for each of these questions.

Question inquiry request 710 is information that identifies a proposed question for registration and subsequent inclusion in the PDI questionnaire downloaded to (or stored by manufacturer within) receivers. As an example, question inquiry request 710 comprises (i) information 730 that identifies a reply format to the question (e.g., Boolean, integer type, single/multiple selection, variable text, etc.), and (ii) the proposed question 735.

In response to question inquiry request 710, service provider 120 receives a returned response 740 that identifies whether the question inquiry request 710 has been granted or denied. In particular, upon granting the request, response 740 includes (i) information 750 to identify whether the request has been granted, and (ii) a question identifier 755 that uniquely identifies the registered question. For instance, question identifier 755 may include a registration number for question 735.

Alternatively, upon denying the request, response 740 includes (i) information 760 to identify whether the request has been denied, and (ii) information 765 to identify the reason(s) for the denial. For instance, information 765 may be a code value that indicates that the question has already been registered, and perhaps the unique question identifier of the pre-existing item may be provided. Alternatively, information 765 may be a code value that indicates that the question contains inappropriate language or subject matter and is denied registration for this reason.

It is contemplated that, as an optional feature, registration entity 720 may be adapted to receive an appeal inquiry 770 that includes information within inquiry request 710 (e.g., reply format information 730 and proposed question 735), information 765 to identify the reason(s) for the denial, and information 775 provided by service provider as to the errors associated with the denial. Information may be a code value (e.g., mistaken relatedness with proposed question, etc.) or may include a textual description of the registration error. Appeal inquiry 770 can be evaluated separately (and in more detail) than inquiry requests.

Figure 7B:
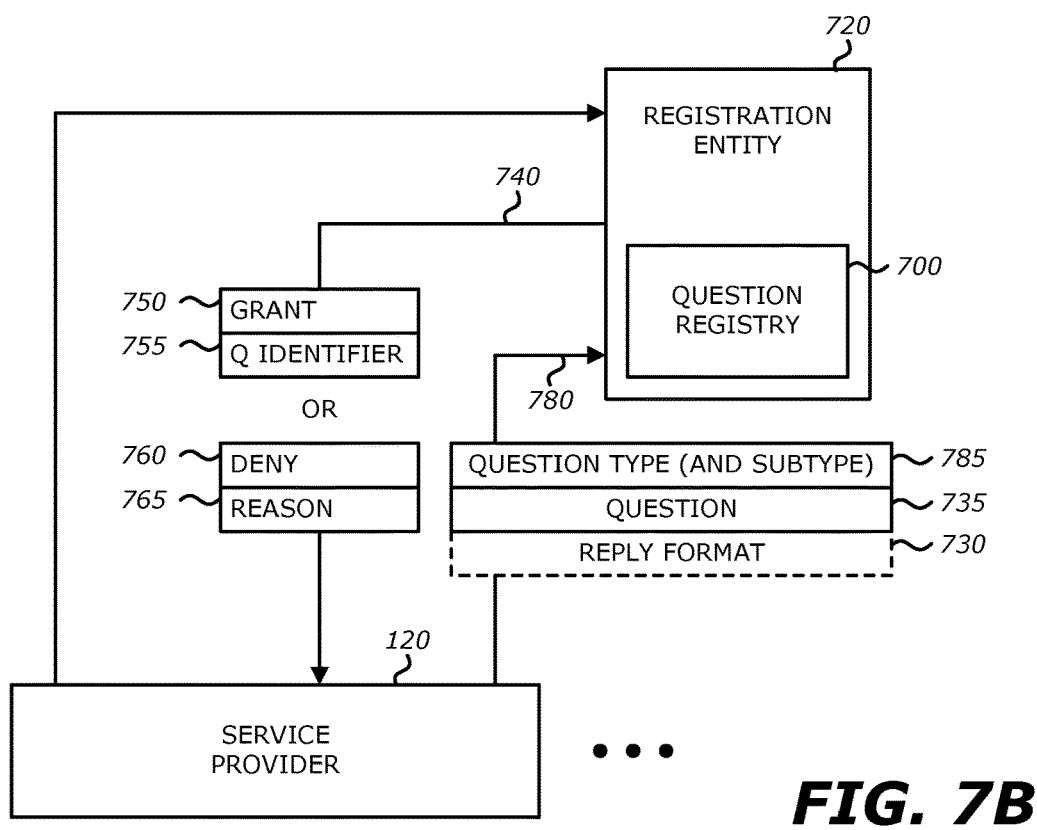
FIG. 7B is an exemplary diagram illustrating a second embodiment directed to the registration of questions within a PDI questionnaire.

Referring now to FIG. 7B, an exemplary diagram illustrating a second embodiment directed to the registration of questions within the PDI questionnaire is shown. Herein, question registry 700 is developed similar to the operations set forth in FIG. 7A. However, question inquiry request 780 features a different format. More specifically, question inquiry request 780 comprises (i) optional information 730 that identifies a reply format to the question (e.g., Boolean, integer type, single/multiple selection, variable text, etc.), (ii) the proposed question 735, and (iii) information 785 to identify particulars (e.g. question types and sub-types) of question 735 such as the following: type of question (e.g. what preference, demographic or interest), or question sub-type (e.g., is question directed to racial inquiries with respect to demographics, is question directed to financial means with respect to demographics, is question directed to preference such as sports one likes to watch, etc.). These particulars 785 are used to categorize the question inquiry requests received from the receiver to assist in producing more timely (and accurate) responses to these requests.

Referring now to FIG. 8A, an exemplary diagram illustrating one embodiment of a portion of a system and method for receiving a PDI questionnaire at a receiver is shown. At decision block 810, the receiver checks to see if any PDI questionnaire is present in storage in the receiving device. If not, the questionnaire is retrieved and the process completes (block 820). If a PDI questionnaire was downloaded previously, the receiver checks to see if a newer version is available (block 830). If not, the process completes, otherwise the existing stored questionnaire is updated to overwrite it with the new version (block 840).

Referring now to FIG. 8B, an exemplary diagram illustrating one embodiment of processing of the PDI questionnaire in the receiver is shown. Herein, at block 850, a receiver accesses and sends a signal for displaying a set-up or preference screen. The receiver determines whether a PDI questionnaire is available at block 860. If the receiver does not currently have a PDI questionnaire in storage, the receiver displays a screen indicating that personalization cannot occur until a later time, and the process ends.

At block 870, questions from the PDI questionnaire are displayed to the user. At block 880, the user inputs answers in response to the PDI questions. At block 890, the PDI answers are stored in a storage device of the receiver.

Herein, according to this embodiment of the invention, the registration entity provides unique identifiers for each submitted question/answer format. For this embodiment of the invention, the registration entity is publicly accessible so that if another provider wishes to ask the same question, the question identifier associated with the desired question can be used as a reference. The registration process also allows service providers to use common wording for a given question.

FIG. 9 is an illustration of an example of a data structure in XML format for representation of PDI questions. As illustrated, standardization of preferences, demographics, and interests (PDIs) involve definition of a standard format for a downloadable questionnaire. The format of the questionnaire may include, but are not limited or restricted to question type identifier 900, question identifier 910, question 920, and candidate answer(s) 930 for the question.

Question type identifier 900 identifies possible reply formats such as yes/no or true/false (QBA—Question Boolean Answer), text string (with maximum length) (QTA—Question Text Answer), multiple choice (QSA—Question Selection Answer), integer (with range limits) (QIA—Question Integer Answer), checklist, etc. Moreover, each question type identifier may further include an optional lifetime parameter to denote a lifetime of the answer to the question (or perhaps the question itself).

For instance, as shown in FIG. 9, QIA 940 concerning the oldest member of the household includes a lifetime attribute 950 that may be used to identify the number of time units (e.g., minutes, hours, days, weeks, months, years, etc.) before the applicability of the answer expires. Of course, lifetime attribute 950 alternatively may be used to identify the duration of the question. Upon expiration of the question, the PDI questionnaire may be updated to seek alternative questions for use in subsequent filtering of content.

The checklist reply format allows a user to provide a yes/no response to a number of different small items. For example, as shown in FIG. 9, the query string might be "in which of the following sports are you interested in viewing?" The checklist might include baseball, basketball, soccer, and hockey. Each of the items in the checklist may be selected or not selected. As previously discussed, access by receiver applications and TDOs to the PDI answers are made available via an API.

Question identifier 910 allows the receiver to identify the question. For example, a question common to all service provider may feature a predetermined range (e.g., identification value ≤255). Furthermore, question identifier 910 allows a question to be associated with a particular service provider. For example, a service provider may be interested in asking if the user has any ideas to make interactive TV services more valuable or attractive. Likewise, question identifier 910 (id value ≥256) allows the service provider to uniquely identify and associate the question with one or more service provider.

Question element "q" 920 includes the actual question (e.g. "are you currently employed?").

Candidate answers 930 associated with question 920 are listed. For instance, a multiple choice reply format would allow the user to select from among a fixed number of identified choices or a single choice. As an example, a query string could be "Do you enjoy camping and outdoor recreation?" The corresponding multiple choice answer might include the possibilities "Never," "Occasionally," or "Frequently."

It is noted that, for questions having multiple section or checklist formats, each answer may be associated with an identifier as well. For instance, the sport "hockey" may be identified by an answer value "413" while "baseball" may be identified by an answer value "411". These values may be used to produce an answer compilation for the question. Alternatively, in lieu of the specific answers themselves, the collection of answers (e.g. candidate answers 930) may be assigned an answer value.

Figure 10:
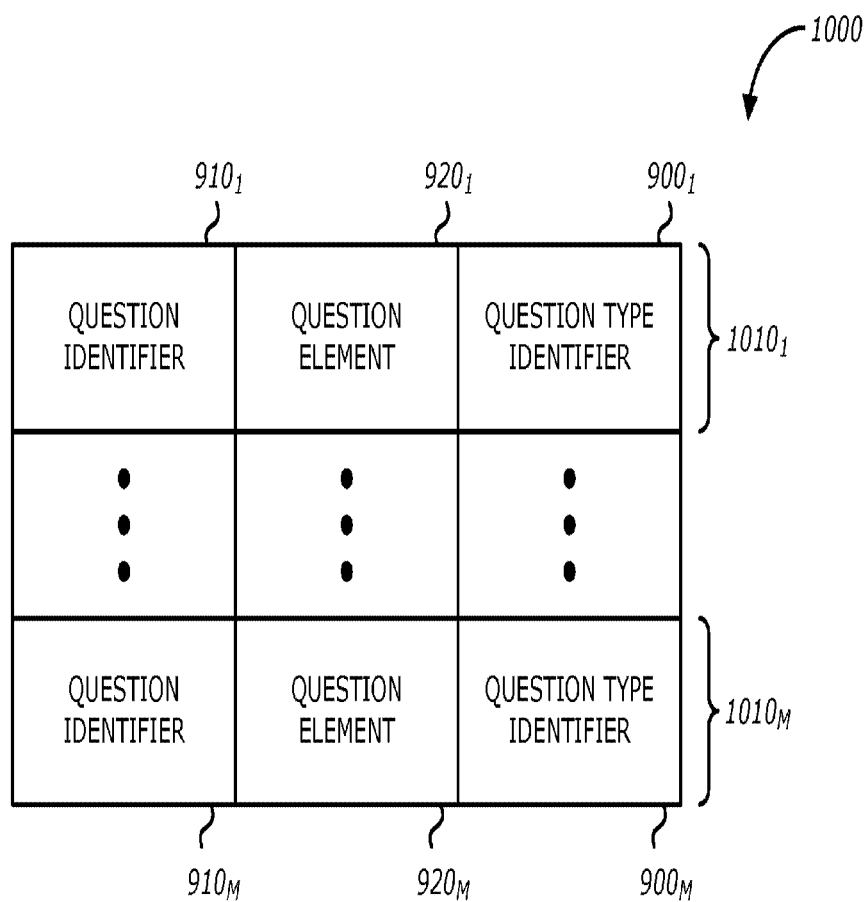
FIG. 10 is a block diagram illustrating one embodiment of a PDI container.

FIG. 10 is a block diagram illustrating one embodiment of a structure of a PDI container 1000. Generated and manipulated through an API implemented on the receiver, PDI container 1000 comprises a plurality of PDI data structures $1010_1$-$1010_M$ (M≥2). More specifically, according to this embodiment of the invention, each PDI data structure $1010_i$ (1≤i≤M) includes defined syntax, representation and matching schema utilized by one or more service providers. For instance, PDI data structure $1010_M$ comprises a question identifier value $910_M$ that is used to identify the particular question registered with registration entity 920 of FIG. 9. It is further contemplated that PDI data structure $1010_M$ may further comprise at least q-element $920_M$ that identifies the question per se, and question type identifier $900_M$ that identifies possible reply formats such as Boolean answers (QBA), text string (QTA), multiple choice (QSA), integer (QIA), checklist, etc.

It is contemplated that PDI container 1000 may be configured with a format for the storage of PDI answers. As an example, each of the PDI data structures (e.g., data structure $1010_M$) may include, but are not limited or restricted to question type identifier $900_M$, question identifier $910_M$, and an answer value (not shown). The answer value represents those items selected by the user at the receiver.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of an information processing apparatus for receiving one or more content items, the method comprising:

receiving, by the information processing apparatus, a first content item and a questionnaire from a first content provider server over a network;

receiving, by the information processing apparatus, an answer from a viewer of the first content item in response to the questionnaire;

storing the answer to the questionnaire;

receiving, by the information processing apparatus, a second content item from a second content provider server over the network, the second content provider server being different from the first content provider server, the second content item being received after the answer to the questionnaire has been stored;

accessing, by a processor of the information processing apparatus, the stored answer to the questionnaire; and filtering, by the information processing apparatus, the second content item provided from the second content provider server based on the accessed answer to the questionnaire that is provided from the first content provider server, storing the filtered second content item, and reproducing the filtered second content item to the viewer, wherein the viewer uses the information processing apparatus to view the filtered second content item reproduced, the first and second content provider servers being external to the information processing apparatus.

2. The method according to claim 1, wherein the questionnaire includes a data structure having a predetermined format common to the first and second content provider servers.

3. The method according to claim 1, wherein the questionnaire includes at least one question associated with a question identifier.

4. A non-transitory computer-readable storage medium storing a program which when executed by a computer causes the computer to perform a method of an information processing apparatus for receiving one or more content items, the method comprising:
receiving, by the information processing apparatus, a first content item and a questionnaire from a first content provider server over a network;
receiving, by the information processing apparatus, an answer from a viewer of the first content item in response to the questionnaire;
storing the answer to the questionnaire;
receiving, by the information processing apparatus, a second content item from a second content provider server over the network, the second content provider server being different from the first content provider server, the second content item being received after the answer to the questionnaire has been stored;
accessing, by a processor of the information processing apparatus, the stored answer to the questionnaire; and
filtering, by the information processing apparatus, the second content item received from the second content provider server based on the accessed answer to the questionnaire that is provided from the first content provider server, storing the filtered second content item, and reproducing the filtered second content item to the viewer, wherein the viewer uses the information processing apparatus to view the filtered second content item reproduced, the first and second content provider servers being external to the information processing apparatus.

5. The non-transitory computer-readable storage medium according to claim 4, wherein the questionnaire includes a data structure having a predetermined format common to the first and second content provider servers.

6. The non-transitory computer-readable storage medium according to claim 4, wherein the questionnaire includes at least one question associated with a question identifier.

7. An information processing apparatus, comprising:
a receiver configured to receive:
a first content item and a questionnaire from a first content provider server over a network; and
a second content item from a second content provider server over the network, the second content provider server being different from the first content provider server; and
at least one processor configured to:
receive an answer from a viewer of the first content item in response to the questionnaire;
store the answer to the questionnaire;
access the stored answer to the questionnaire;
filter the second content item provided from the second content provider server based on the accessed answer to the questionnaire that is provided from the first content provider server,
store the filtered second content item; and
reproduce the filtered second content item to the viewer, wherein
the second content item is received after the answer to the questionnaire has been stored and the viewer uses the information processing apparatus to view the filtered second content item reproduced, the first and second content provider servers being external to the information processing apparatus.

8. The information processing apparatus according to claim 7, wherein the questionnaire includes a data structure having a predetermined format common to the first and second content provider servers.

9. The information processing apparatus according to claim 7, wherein the questionnaire includes at least one question associated with a question identifier.

10. The method according to claim 1, wherein the questionnaire allows the viewer to specify information about the viewer's interests and preferences.

11. The method according to claim 1, wherein:
receiving the first content item and the questionnaire includes receiving a first digital television broadcast signal that includes the first content item and the questionnaire; and
receiving the second content item includes receiving a second digital television broadcast signal that includes the second content item.

12. The non-transitory computer-readable storage medium according to claim 4, wherein the questionnaire allows the viewer to specify information about the viewer's interests and preferences.

13. The non-transitory computer-readable storage medium according to claim 4, wherein:
receiving the first content item and the questionnaire includes receiving a first digital television broadcast signal that includes the first content item and the questionnaire; and
receiving the second content item includes receiving a second digital television broadcast signal that includes the second content item.

14. The information processing apparatus according to claim 7, wherein the questionnaire allows the viewer to specify information about the viewer's interests and preferences.

15. The information processing apparatus according to claim 7, wherein the receiver is configured to receive:
a first digital television broadcast signal that includes the first content item and the questionnaire; and
a second digital television broadcast signal that includes the second content item.

* * * * *